United States Patent
Hartwich et al.

(10) Patent No.: US 9,514,073 B2
(45) Date of Patent: Dec. 6, 2016

(54) DEVICE AND METHOD FOR GLOBAL TIME INFORMATION IN EVENT-CONTROLLED BUS COMMUNICATION

(75) Inventors: Florian Hartwich, Reutlingen (DE); Christian Horst, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 609 days.

(21) Appl. No.: 13/825,265

(22) PCT Filed: Sep. 22, 2011

(86) PCT No.: PCT/EP2011/066474
§ 371 (c)(1),
(2), (4) Date: May 21, 2013

(87) PCT Pub. No.: WO2012/038493
PCT Pub. Date: Mar. 29, 2012

(65) Prior Publication Data
US 2013/0238826 A1  Sep. 12, 2013

(30) Foreign Application Priority Data
Sep. 24, 2010  (DE) .................. 10 2010 041 363

(51) Int. Cl.
*G06F 13/372* (2006.01)
*H04J 3/06* (2006.01)
(Continued)

(52) U.S. Cl.
CPC ......... *G06F 13/372* (2013.01); *H04J 3/0655* (2013.01); *H04J 3/0664* (2013.01);
(Continued)

(58) Field of Classification Search
CPC .......... H04J 3/06; H04J 3/0664; H04J 3/0655; H04L 2012/40215; H04L 12/40026; H04L 12/4035; G06F 1/12
See application file for complete search history.

(56) References Cited

U.S. PATENT DOCUMENTS

2001/0018720 A1 *  8/2001  Weigl et al. ................... 710/117
2006/0174042 A1 *  8/2006  Weigl et al. ................... 710/100
(Continued)

FOREIGN PATENT DOCUMENTS

CN  1258404 A  6/2000
EP  0 940 954  9/1999
(Continued)

OTHER PUBLICATIONS

International Search Report for PCT/EP2011/066474, dated Jan. 27, 2012.
(Continued)

*Primary Examiner* — Tim T Vo
*Assistant Examiner* — Phong H Dang
(74) *Attorney, Agent, or Firm* — Norton Rose Fulbright US LLP; Gerard Messina

(57) ABSTRACT

In a method for exchanging data in messages between users of a CAN bus system, the users have their own time bases; a first user functioning as timer transmits a reference message having a specifiable identifier via the bus, which includes a first time information with regard to the time base of the first user; the at least second user, using its time base forms its own second time information as a function of the first time information of the first user in such a way that, from the deviation of the first and the second time information a correction value is ascertained, so that from the first time information of the first user as the timer, the global time for the bus system is yielded.

13 Claims, 2 Drawing Sheets

(51) Int. Cl.
*H04L 12/40* (2006.01)
*H04L 12/403* (2006.01)

(52) U.S. Cl.
CPC .... *H04L 12/40026* (2013.01); *H04L 12/4035* (2013.01); *H04L 2012/40215* (2013.01)

(56) References Cited

U.S. PATENT DOCUMENTS

2007/0094528 A1* 4/2007 Fredriksson et al. ......... 713/375
2010/0293315 A1* 11/2010 Hartwich ...................... 710/305

FOREIGN PATENT DOCUMENTS

| EP | 1 115 220 | 4/2009 |
|----|-----------|--------|
| WO | WO 98/54872 | 12/1998 |
| WO | WO 03/025686 | 3/2003 |
| WO | WO 03/085921 | 10/2003 |
| WO | WO 2009/053332 | 4/2009 |
| WO | WO 2009/109590 | 9/2009 |

OTHER PUBLICATIONS

Joachim Hillerbrand et al. "Coexistance of Time-Triggered and Event-Triggered Traffic in Switched Full-Duplex Ethernet Networks", Industrial Embedded Systems, Jul. 1, 2007, pp. 217-224.
Road-Vehicles—Controller area network (CAN)—Part 4, Time-triggered communication, first edition, IEEE draft, Aug. 1, 2004, pp. 1-40.
Cena et al: "New efficient communication services for ISO 11898 networks", Computer Standards and Interfaces, vol. 22, No. 1, Mar. 1, 2000, pp. 61-74.
Cena G, et al.: "Overclocking of controller area networks", Electronics Letters, IEEE Stevenage, vol. 35, No. 22, Oct. 28, 1999, pp. 1923-1925.

* cited by examiner

DEVICE AND METHOD FOR GLOBAL TIME INFORMATION IN EVENT-CONTROLLED BUS COMMUNICATION

BACKGROUND OF THE INVENTION

1. Field of the Invention

The present invention relates to a device for use in user stations of a CAN bus system which is equipped to provide and process a global time information in the event-controlled exchange of data with other user stations of the CAN bus system, as well as the bus system developed using such user stations.

2. Description of the Related Art

From International standards ISO 11898-1, -2 and -3 the "Controller Area Network" (CAN) is known, which includes an event-controlled method for the exchange of data between users of a bus system. The media access control method is based on the bit-wise arbitration, in which a plurality of user stations are simultaneously able to try to transmit data via the channel of the bus system, without thereby interfering with the data transmission. The user stations are able to ascertain the logical state (0 or 1) of the channel while transmitting a bit over the channel. If a value of the bit sent does not correspond to the ascertained logical state of the channel, the user station terminates the access to the channel.

Because of the bit-wise arbitration, a non-destructive transmission of the data frame over the channel is achieved. Good real time properties of the CAN are yielded thereby.

From international Standard ISO 11898-4, for example, an extension of the CAN is known that is designated as "Time-Triggered CAN" (TTCAN). According to the TTCAN protocol specification, in the so-called system matrix, a time window structure is defined which has a plurality of successive base cycles which, in turn, are made up of time windows (often also designated as "time slots") whose sequence repeats regularly. In this way, each message, and consequently the sending user station, is able to have allocated to it a certain time window, within which this message has to be transmitted. There is also the possibility, in time windows, of releasing the access, coordinated by arbitration, to a plurality of user stations. In TTCAN, the access to the channel is thus at least partially coordinated by a time-controlled method.

In TTCAN, a distinction is made between TTCAN Level 1 and TTCAN Level 2. In both cases, the communication takes place in a sequence of base cycles which are initiated in each case by a reference message. The difference between the two levels is that in Level 2 the reference message includes information on synchronizing a global time information or global time. Thus, TTCAN is distinguished in that the user stations may be provided with global time information by a time master. One specified procedure for synchronization takes care that all user stations use uniform global time data.

CAN controllers, which control TTCAN Level 2, have a circuit (counter, arithmetic unit, control unit) which synchronizes and calibrates the Global Time in Hardware, and enables time measurement and time status indication.

The TTCAN protocol also includes monitoring functions, which are supposed to ensure that the CAN communication maintains the previously specified fixed time reference. If errors occur in the time reference, the time base is indicated as being invalid. In response to serious errors, the CAN communication may be stopped.

In certain applications, the time control of the bus communication is either not possible or at least not meaningful, or the effort to set up the system matrix is unjustifiably costly. Still, providing global time information, as is performed by TTCAN Level 2, is desirable in order to be able to use the time information in the algorithms which run in the user stations.

The methods known from the related art do not deliver results that are satisfactory in every respect.

BRIEF SUMMARY OF THE INVENTION

An object of the present invention is to provide a modified communications device for application in user stations of a CAN bus system, which maintains the advantages of providing global time information from the TTCAN Level 2, and at the same time does not make absolutely necessary the time control and the setting up of a complete system matrix, which is required in TTCAN according to the related art.

For this purpose, a further development of a TTCAN controller is described, which stands out in that the hardware, known from the TTCAN controller for representing the global time for TTCAN Level 2 is also able to be used in the device according to the present invention in a normal, event-controlled CAN communication.

The object described is attained, according to the present invention, in that the TTCAN controller is put into a special operating state, in which the CAN communication takes place in the usual, event-controlled manner, while the hardware for showing the global time works as in TTCAN Level 2.

This has the advantage that an automatically synchronized and calibrated time base is made available to all nodes in the CAN network. In this connection there is no calculating expenditure in the software, which is of particular advantage.

However, in contrast to TTCAN Protocol Level 2 according to ISO 11898-4, it is not necessary that the CAN communication take place in a time-controlled manner. The expenditure connected with this, of setting up the complete system matrix, is also not required. The method is also able to be used if, based on the physical, technical or other boundary conditions, a time-controlled communication is not to be set up.

Furthermore, it is advantageous that, in a TTCAN controller, which already controls TTCAN Level 2, the additional cost, for instance, of the design and the provision of the method according to the present invention is low.

DETAILED DESCRIPTION OF THE INVENTION

Furthermore, exemplary embodiments are described for the method and device according to the present invention.

These specific examples are used to explain the embodiment, but they do not limit the scope of the inventive thought.

Figure 1:
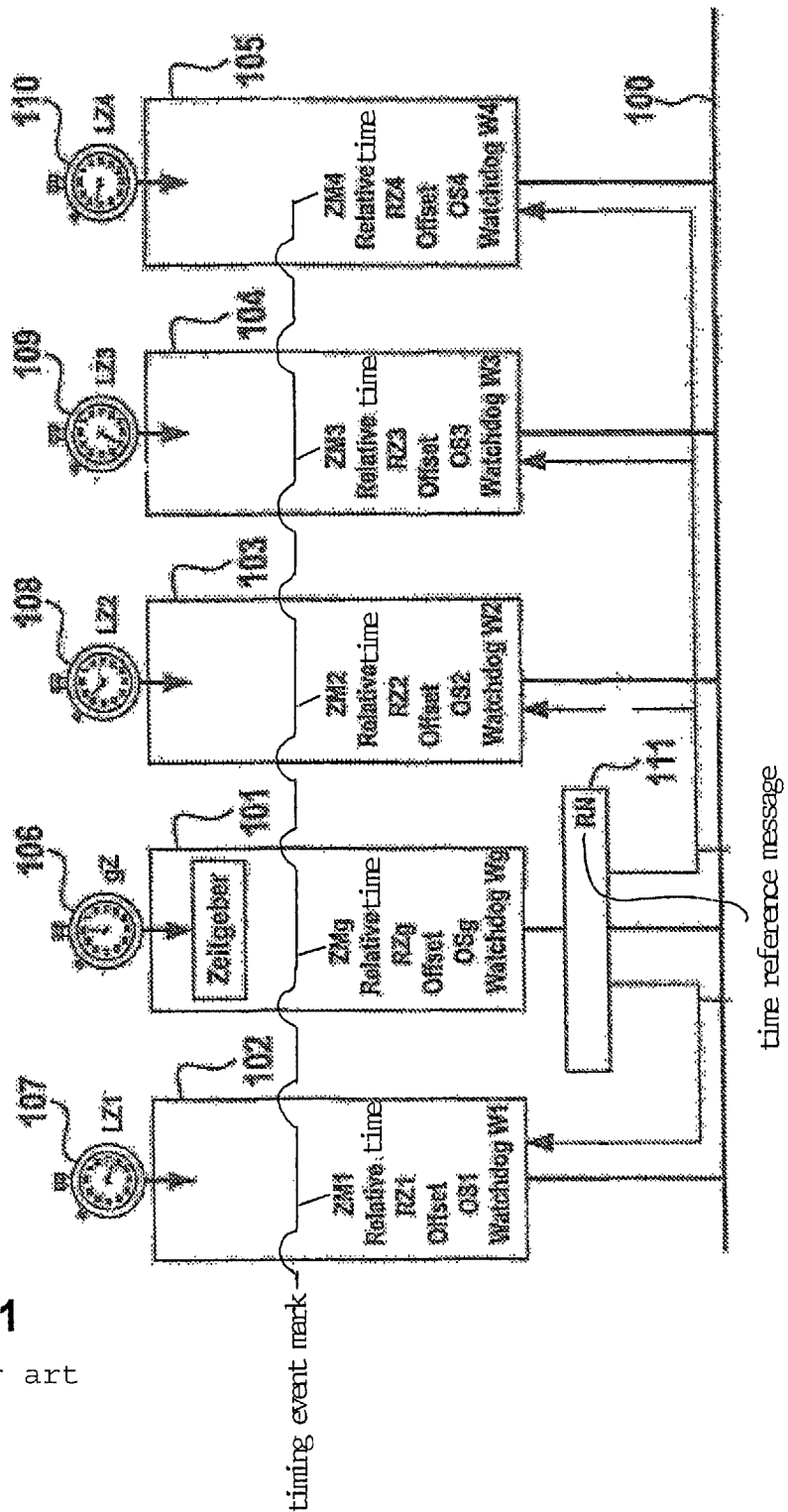
FIG. 1 shows a bus system 100 including several bus users 101 through 105, in which each user 101 through 105 has its own time base 106 through 110.

FIG. 1 shows a bus system 100 including several bus users 101 through 105. In this context, each user 101 through 105 has its own time base 106 through 110, which is able to be transmitted to the respective user, on the one hand, by an internal means such as a clock, a counter, or a clock generator, etc., or externally. The respective local time base lZ1 through lZ4 is, in particular, a counter which is incremented, for example, in steps of 16 bits, and which can only be influenced by an HW reset. Here, the local time base is implemented in each node or user 102 through 105. One user, timer 101, has an exposed position in this context. Its time base is denoted by global time gZ as global time base 106 and is either implemented in timer 101 or externally transmitted to it. Global time gZ is in principle, generated in each node from local time base 107 through 110 or local time IZ (IZ1 through lZ4) and an offset OS1 to OS4. As a rule, this offset Osg at timer 101 is equal to zero (Osg=0). All other nodes form their view on global time gZ from local time IZ (IZ1 through lZ4) and local offset OS1 through OS4 and OSg when OSg is not equal to zero. The case in which OSg is not equal to zero occurs, for instance, when global time gZ is transmitted from outside to timer 101, and this additionally includes its own time base 106. Then, the timer is also calibrated to global time gZ, and gZ and time base 106 possibly do not match each other. The local offset is the difference between the local time at the point of transmission (SOF, start of frame) of the reference message and the global time transmitted by the timer in this reference message.

In this respect, the method corresponds to the usual method for providing global time information in the TTCAN.

The following deviations from the TTCAN specification will now be newly introduced so as to attain the object described, and to achieve the advantages striven for, over the related art:

The CAN messages are not sent out automatically time-controlled, but only if this is requested by the software in the host controller. This also applies to the reference message. A time-controlled interrupt may be used, for example, to arrange for the host controller to make the request. The request may be made as a function of certain events, such as the presence of a certain result of a calculation within the software. The receipt of a certain predefined message or of a remote frame is also able to trigger the request. The form of the reference message sent follows the definition in the Standard ISO 11898-4, Chapter 5.3.3.

The receivers of a reference message evaluate it as is provided according to the given standard for TTCAN Level 2. This means that the "Master_Ref_Mark" included in the reference message is the basis for the system-wide global time. The error treatment takes place in deviation from the TTCAN standard, as will be stated below, in connection with the behavior of the "error level" within the Master-State.

The Master-State of a user station in TTCAM is described, according to the standard, by a 6-bit vector, which is composed of three sub-vectors "error level", "sync mode" and "master-slave mode", each having 2 bits. In the following, the possible states and state transitions in the user stations according to the present invention are described, the magnitude of the master-state vector also being able to take on another value, such as 5 bits, using only one bit for "error level".

Figure 2:
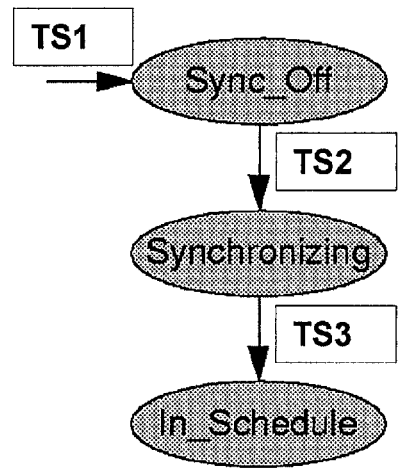
FIG. 2 shows the part of the state diagram of the devices according to the present invention which describes the synchronization method.

1) Sync_Mode:

In FIG. 2, the synchronization control unit is described, which treats the states and the state transitions of the sub-vector "sync_mode". By contrast to the related art, according to ISO 11898-4 the state "In_Gap" is excluded. A possible "Next_is_Gap" bit in the reference message, by which the timer normally signals that it will synchronize the start of the next base cycle in the TTCAN time scheme to a specific event, and that therefore a deviation may occur from a strictly periodic sequence of the communication, is ignored by the user stations according to the present invention, since there is anyhow no strict periodic sequence. Alternatively, it may also be established that the "Next_is_Gap" bit is always sent using an established value, such as 0, and this may be checked upon receipt of the reference message. In any case, the control unit described in ISO 11898-4, Chapter 9.4.2 becomes simplified to the variant described in FIG. 2.

At the system start, after a resetting of the hardware or in error state S3, "sync_mode" takes on the value "Sync_Off". This transition characterized by TSO always has preference. After the close of the initialization and the resetting of the local time base, transition TS1 into the mode "Synchronizing" takes place. In this state, analogously to ISO 11898-4, Chapter 8.2, all potential timers send a reference message, and in this way ascertain the currently active timer. The latter sends a further reference message, and after receipt of the further reference message, possibly using checking of the correct value of "Next_is_Gap" bit and/or "Disc_Bit", the user stations change via transition TS2 into the state "In schedule".

2) Error Level:

Sub-vector "error level" within the Master-State may within TTCAM, according to the standard, take on four different error states, which are designated by S0 through S3, and are described in ISO 11909-4, Chapter 9.1. All error conditions which effect a change in states S1 or S2 refer, in this case, to the error in the TTCAN time reference.

In user stations according to the present invention, these error conditions drop out, since no time reference is provided for the bus communication. For this reason, in the user stations according to the present invention only the two error conditions specified in ISO 11898-4, namely "CAN_Bus_Off" and "Watch_Trigger_Reached are used, which both lead to a transition into error state S3. If none of the error conditions is present, the user station is in error state S0. Since the error station is only able to assume two error states, one single bit is enough to image the "error level". However, as in the TTCAN according to standard, a 2-bit vector may also be used. As timing event mark for the "Watch Trigger", a constant may be used, such as 0xFF00.

In user stations according to the present invention, there are only the two error states S0 and S3, as described. In S3 the time base is indicated as invalid, the synchronization control unit and the master-slave control unit are reset. In a different manner from that provided in the related art for TTCAN according to ISO 11898-4, in error state S3, the CAN communication is not stopped, but the next valid reference message has the effect that the system is switched back from S3 to S0.

Figure 3:
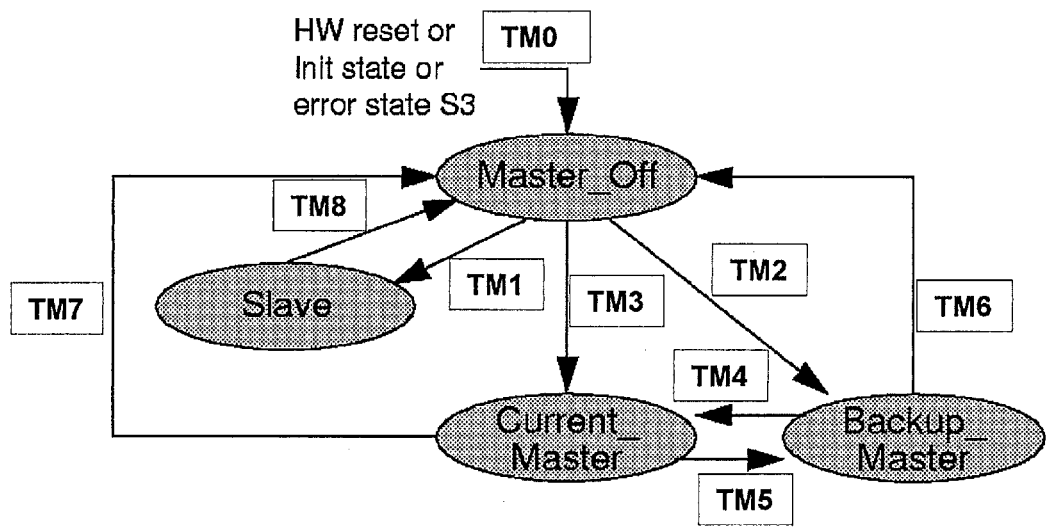
FIG. 3 shows the part of the state diagram of the devices according to the present invention which describes the master-slave behavior.

3) Master-Slave_Mode:

In FIG. 3, the master-slave control unit according to the present invention is described, which treats the states and the state transitions of the sub-vector "master-slave_mode". It functions in user stations according to the present invention largely as in ISO 11898-4, Chapter 9.4.3. The state changes, that are effected by error state S2, however, are omitted.

The device according to the present invention is advantageously defined so that it is configurable or switchable between the behavior according to the present invention and a TTCAN behavior according to Standard ISO 11898-4. For this purpose, the device has a storage area or a configuration register, in which the desired mode of the media access control method is able to be selected. This means that the device is optionally switchable between a TTCAN operation according to the related art and the event-controlled operation, according to the present invention, having global time information. In response to switching over into the mode according to the present invention, the control units and hardware devices provided for the TTCAN operation may continue to be used, but then not all possible values are taken up.

All-in-all, because of the present invention shown, having the exemplary embodiments explained, the technical object is attained, namely of providing a communications method for CAN bus systems, that is advantageous over the related art, and that maintains the advantages of a global time from the TTCAN, and does not absolutely require the time control required in the case of TTCAN as far as the related art is concerned.

What is claimed is:

1. A system for exchanging data in messages using a CAN bus system, comprising:
   a plurality of users, wherein each of the users has a respective local time base, and wherein each of the users represents a node;
   wherein a first user among the plurality of users functions as a system timer, the first user transmitting a reference message having a specified identifier via the bus, the reference message including a first time information with regard to a first local time base of the first user;
   wherein a second user among the plurality of users uses a second local time base associated with the second user to form the second user's own second time information as a function of the first time information of the first user so that a correction value is determined based on a deviation between the first time information and the second time information, so that from the first time information of the first user as the system timer, a global time for the bus system is yielded;
   wherein the reference message is repeatedly transmitted without a fixed time reference and exchange of messages between the users of the CAN bus system takes place in an event-controlled manner, the exchange of messages complying with the arbitration method according to the CAN standard;
   wherein the global time is generated in each of the nodes from its respective local time base and a respective local offset, and wherein the respective local offset is a difference between a local time at a point of transmission of a reference message and the global time transmitted in the reference message; and
   wherein, each user has one of a storage area or a register for configuration of a media access control method in each user, and wherein upon entering a specified value in said one of the storage area or the register, the exchange of messages between the users of the CAN bus system is able to be switched over to a time-controlled operation according to the TTCAN extension of the CAN standard.

2. The system as recited in claim 1, wherein each user has a circuit for ascertaining the global time, the circuit including a counter, an arithmetic unit, and a control unit.

3. The system as recited in claim 2, wherein modified transition conditions between the states of the control unit are used, as a function of the media access control method selected by writing on one of the storage area or the register.

4. The system as recited in claim 2, wherein each user has a register provided for assignment of a possibility of taking over the function of the timer.

5. The system as recited in claim 4, wherein, in response to an assignment of the possibility of taking over the function of the timer, after a new start or a resetting, the assigned user carries out an attempt to transmit a reference message.

6. A system for exchanging data in messages using a CAN bus system, comprising:
   a plurality of users, wherein each of the users has a respective local time base;
   wherein a first user among the plurality of users functions as a system timer, the first user transmitting a reference message having a specified identifier via the bus, the reference message including a first time information with regard to a first local time base of the first user;
   wherein a second user among the plurality of users uses a second local time base associated with the second user to form the second user's own second time information as a function of the first time information of the first user so that a correction value is determined based on a deviation between the first time information and the second time information, so that from the first time information of the first user as the system timer, a global time for the bus system is yielded;
   wherein the reference message is repeatedly transmitted without a fixed time reference and exchange of messages between the users of the CAN bus system takes place in an event-controlled manner complying with the arbitration method according to the CAN standard;
   wherein, in response to an absence of a reference message for a specified time in the event-controlled mode, a new start is carried out;
   wherein the global time is generated in each of the nodes from its respective local time base and a respective local offset, and wherein the respective local offset is a difference between a local time at a point of transmission of a reference message and the global time transmitted in the reference message; and
   wherein, each user has one of a storage area or a register for configuration of a media access control method in each user, and wherein upon entering a specified value in said one of the storage area or the register, the exchange of messages between the users of the CAN bus system is able to be switched over to a time-controlled operation according to the TTCAN extension of the CAN standard.

7. The system as recited in claim 1, wherein the second user, which is not executing the function of the timer, adjusts the time base of the second user as a function of the correction value ascertained.

8. A method for exchanging data in messages between users of a CAN bus system, each of the users having a respective local time base, the method comprising:
   transmitting, by a first user which functions as a system timer, a reference message having a specified identifier via the bus, the reference message including a first time information with regard to a first local time base of the first user;
   forming, by a second user using a second local time base of the second user, a second time information of the second user as a function of the first time information of the first user so that a correction value is determined based on a deviation between the first time information and the second time information, so that from the first time information of the first user as the system timer, a global time for the bus system is yielded; and wherein the reference message is repeatedly transmitted without a fixed time reference and exchange of messages between the users of the CAN bus system takes place in an event-controlled manner, the exchange of messages complying with the arbitration method according to the CAN standard;

wherein the global time is generated in each of the nodes from its respective local time base and a respective local offset, and wherein the respective local offset is a difference between a local time at a point of transmission of a reference message and the global time transmitted in the reference message; and wherein, each user has one of a storage area or a register for configuration of a media access control method in each user, and wherein upon entering a specified value in said one of the storage area or the register, the exchange of messages between the users of the CAN bus system is able to be switched over to a time-controlled operation according to the TTCAN extension of the CAN standard.

9. The method as recited in claim 8, wherein each user has a circuit for ascertaining the global time, the circuit including a counter, an arithmetic unit, and a control unit, and wherein modified transition conditions between the states of the control unit are used, as a function of the media access control method selected by writing on one of the storage area or the register.

10. The method as recited in claim 8, wherein a possibility of assuming the function of the system timer is assigned to a plurality of users.

11. The method as recited in claim 10, wherein bus users, to whom the possibility of taking over the function of the system timer has been assigned, execute a transmission attempt for a reference message after a new start or a resetting.

12. The method as recited in claim 10, wherein, in response to an absence of a reference message for a specified time in the event-controlled mode, a new start is carried out.

13. The method as recited in claim 10, wherein bus users which do not assume the function of the system timer adjust their own respective time bases as a function of the correction value ascertained.

* * * * *